(12) United States Patent
Pei

(10) Patent No.: US 8,250,739 B2
(45) Date of Patent: Aug. 28, 2012

(54) MULTI-FUNCTIONAL ASSEMBLY DEVICE

(75) Inventor: Shao-Kai Pei, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 430 days.

(21) Appl. No.: 12/691,889

(22) Filed: Jan. 22, 2010

(65) Prior Publication Data

US 2011/0047787 A1 Mar. 3, 2011

(30) Foreign Application Priority Data

Aug. 27, 2009 (CN) .......................... 2009 1 0306160

(51) Int. Cl.
*B23P 19/00* (2006.01)
*B23P 21/00* (2006.01)
*B23Q 3/00* (2006.01)

(52) U.S. Cl. ................ 29/700; 29/701; 29/729; 29/702; 29/703

(58) Field of Classification Search .................... 29/700, 29/701, 702, 703, 729, 464; 359/819, 809
See application file for complete search history.

(56) References Cited

U.S. PATENT DOCUMENTS

| | | | | |
|---|---|---|---|---|
| 7,365,925 B2 * | 4/2008 | Wayne et al. | ................. | 359/822 |
| 7,534,063 B2 * | 5/2009 | Lin | ................ | 401/265 |
| 7,551,357 B2 * | 6/2009 | Huang | .......................... | 359/619 |
| 7,567,393 B2 * | 7/2009 | Chen et al. | .................... | 359/809 |
| 7,663,821 B2 * | 2/2010 | Huang | .......................... | 359/819 |
| 7,876,512 B2 * | 1/2011 | Wong et al. | .................... | 359/818 |
| 7,918,261 B2 * | 4/2011 | Lee | ............................. | 156/380.9 |
| 7,926,159 B2 * | 4/2011 | Tsai | ........................... | 29/407.04 |
| 7,971,344 B2 * | 7/2011 | Wu | ................................. | 29/700 |
| 8,049,975 B2 * | 11/2011 | Lin | ................................. | 359/811 |
| 8,091,214 B2 * | 1/2012 | Huang et al. | .................... | 29/729 |
| 2008/0105710 A1* | 5/2008 | Yu | ................................. | 222/160 |
| 2008/0158699 A1* | 7/2008 | Chen et al. | .................... | 359/819 |
| 2008/0173393 A1* | 7/2008 | Lee | ............................. | 156/275.5 |
| 2009/0019684 A1* | 1/2009 | Wu | ................................. | 29/468 |
| 2009/0128929 A1* | 5/2009 | Wong et al. | .................... | 359/819 |
| 2009/0147382 A1* | 6/2009 | Huang | .......................... | 359/819 |
| 2009/0277383 A1* | 11/2009 | Chuang | .......................... | 118/667 |
| 2011/0209342 A1* | 9/2011 | Huang et al. | .................... | 29/729 |

FOREIGN PATENT DOCUMENTS

| | | | | |
|---|---|---|---|---|
| JP | 2008003179 A | * | 1/2008 | |
| TW | 200801626 A | * | 1/2008 | |
| TW | 200808488 A | * | 2/2008 | |
| TW | 200831973 A | * | 8/2008 | |
| TW | 200834143 A | * | 8/2008 | |
| TW | 200841979 A | * | 11/2008 | |

* cited by examiner

*Primary Examiner* — Essama Omgba
(74) *Attorney, Agent, or Firm* — Altis Law Group, Inc.

(57) ABSTRACT

A multi-functional assembly device includes a fixed barrel, a number of supporting boards, a rotatable barrel, and a driving device for rotating the rotatable barrel. The fixed barrel includes a number of sidewalls and defines a chamber surrounded by the sidewalls. The supporting boards are configured for holding the lens modules and are able to be secured on the inner surfaces of the sidewalls. The rotatable barrel includes a main body, a number of carrying devices, a number of glue dispensers, and a number of glue solidifying devices. The main body includes a first side surface, a second side surface, and a third side surface facing the inner surfaces of the sidewalls. The carrying devices, the glue dispensers, and the glue solidifying devices are installed on the first side surface, the second side surface, and the third side surface respectively.

20 Claims, 4 Drawing Sheets

MULTI-FUNCTIONAL ASSEMBLY DEVICE

BACKGROUND

1. Technical Field

The present disclosure relates to assembly devices and, particularly, to a multi-functional assembly device used in lens modules assembly.

2. Description of Related Art

Nowadays, lens modules are widely employed in camera systems and mobile phones for capturing images. Generally, a lens module includes components such as lenses, spacers, and a filter (e.g., IR-cut filter). These components can be assembled into the lens module and arranged along an optical axis of the lens module. In order to assemble these components, a glue dispenser is first used to dispense glue onto the lens module, then, a carrying device carries the components into the lens module, and a glue solidifying device is used to solidify the glue. Therefore, in order to assemble the filter into the lens module, several space-consuming devices are required.

What is needed, therefore, is a multi-functional assembly device to overcome or at least mitigate the above-described problem.

BRIEF DESCRIPTION OF THE DRAWINGS

Many aspects of the present multi-functional assembly device can be better understood with reference to the accompanying drawings. The components in the drawings are not necessarily drawn to scale, the emphasis instead being placed upon clearly illustrating the principle of the present multi-functional assembly device. In the drawings, all the views are schematic.

DETAILED DESCRIPTION

Embodiments of the present disclosure will now be described in detail below, with reference to the accompanying drawings.

Figure 1:
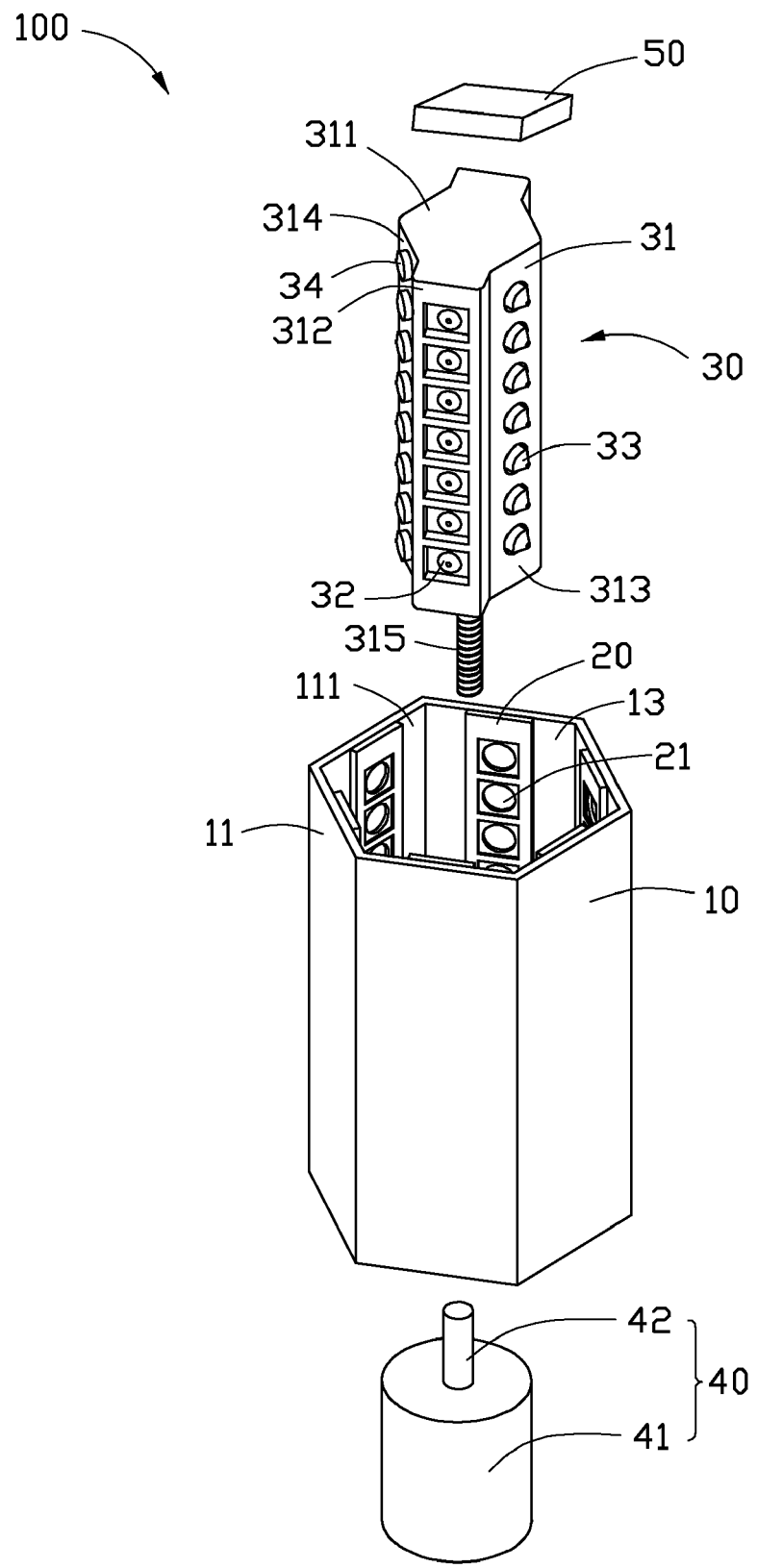
FIG. 1 is an exploded, isometric view of a multi-functional assembly device according to an exemplary embodiment.
Figure 4:
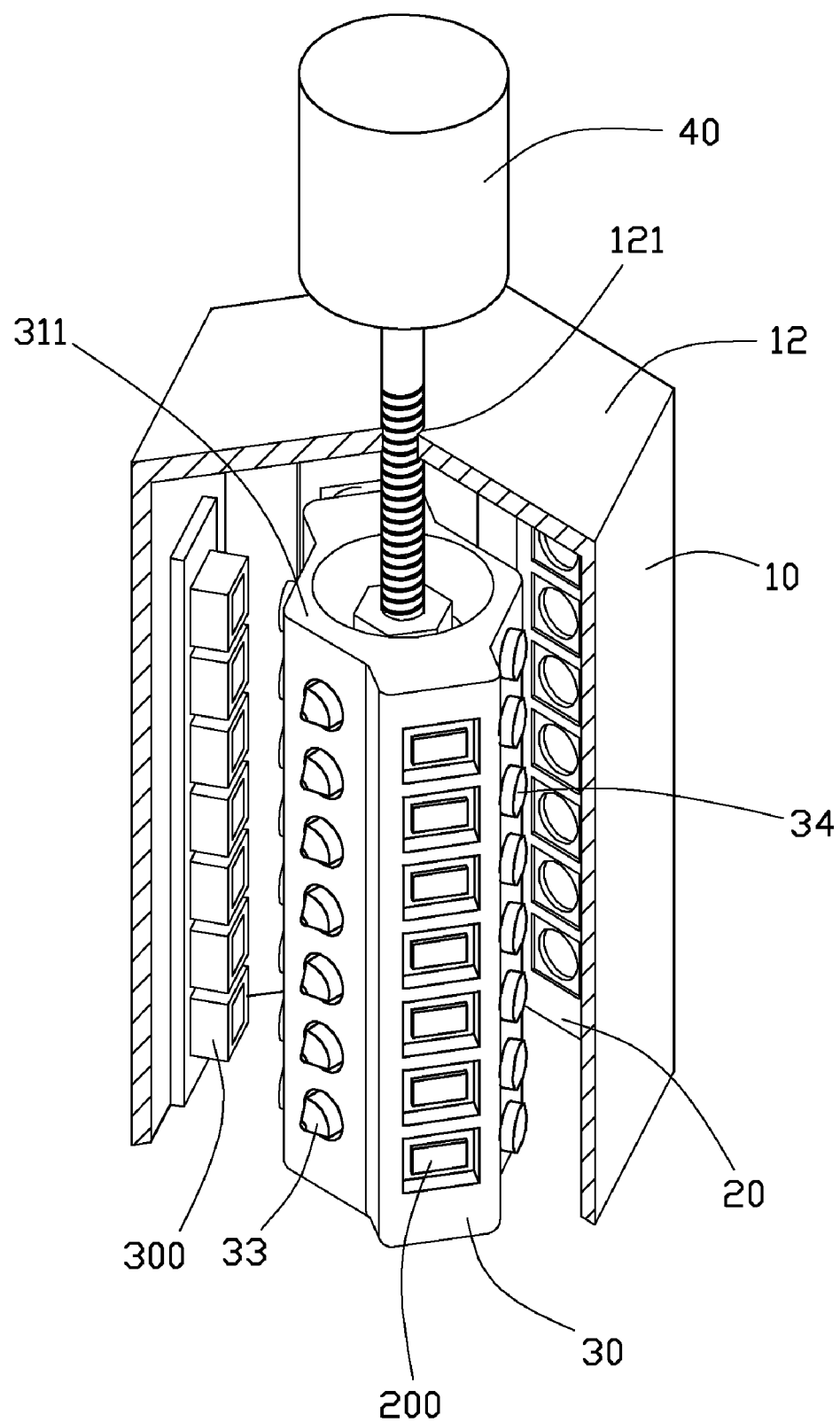
FIG. 4 is a cut-away view of the multi-functional assembly device of FIG. 1 after being assembled.

Referring to FIGS. 1 and 4, a multi-functional assembly device 100, according to an exemplary embodiment, is shown. The multi-functional assembly device 100 is configured for mounting a number of components 200 into a number of lens modules 300 respectively. The component 200 can be selected from a group consisting of lenses, spacers, and filters. In the present embodiment, the component 200 is a filter. The multi-functional assembly device 100 includes a fixed barrel 10, a number of supporting boards 20, a rotatable barrel 30, a driving device 40, and a controller 50.

The fixed barrel 10 is generally hexagonal prism-shaped and symmetrical about the center axis thereof. The fixed barrel 10 includes six sidewalls 11 and a bottom wall 12. The six sidewalls 11 and the bottom wall 12 cooperatively define hexagonal prism-shaped chamber 13. Each sidewall 11 includes an inner surface 111 with a supporting board 20 secured thereon. The bottom wall 12 defines a shaft hole 121 therethrough generally at the center.

Each supporting board 20 is secured on one of the inner surfaces 111 of the sidewall 11. Each supporting board 20 defines a number of holding grooves 21 thereon for holding lens modules 300. Moreover, the supporting boards 20 albeit detachable from the sidewalls 11, can be integrally formed with the sidewalls 11.

It should be understood that the hexagonal prism-shaped chamber 13 is not limited to this embodiment. To reduce or increase the number of the sidewalls 11 for holding less or more supporting boards 20, other types of prism chamber or columnar chamber having less or more sidewalls 11 can be employed.

The rotatable barrel 30 is received in the prism chamber 13. The rotatable barrel 30 includes a prism main body 31, a number of carrying devices 32, a number of glue dispensers 33, and a number of glue solidifying devices 34.

The main body 31 is generally hexagonal prism-shaped and includes two opposite end surfaces 311, two opposite first side surfaces 312, two opposite second side surfaces 313, and two opposite third side surfaces 314. The second side surface 313, the first side surface 312, and the third side surface 314 are connected in sequence. The main body 31 further includes a shaft 315 extending out of the fixed barrel 10 via the shaft hole 121 from one of the end surfaces 311 facing the bottom wall 12 of the fixed barrel 10.

Figure 2:
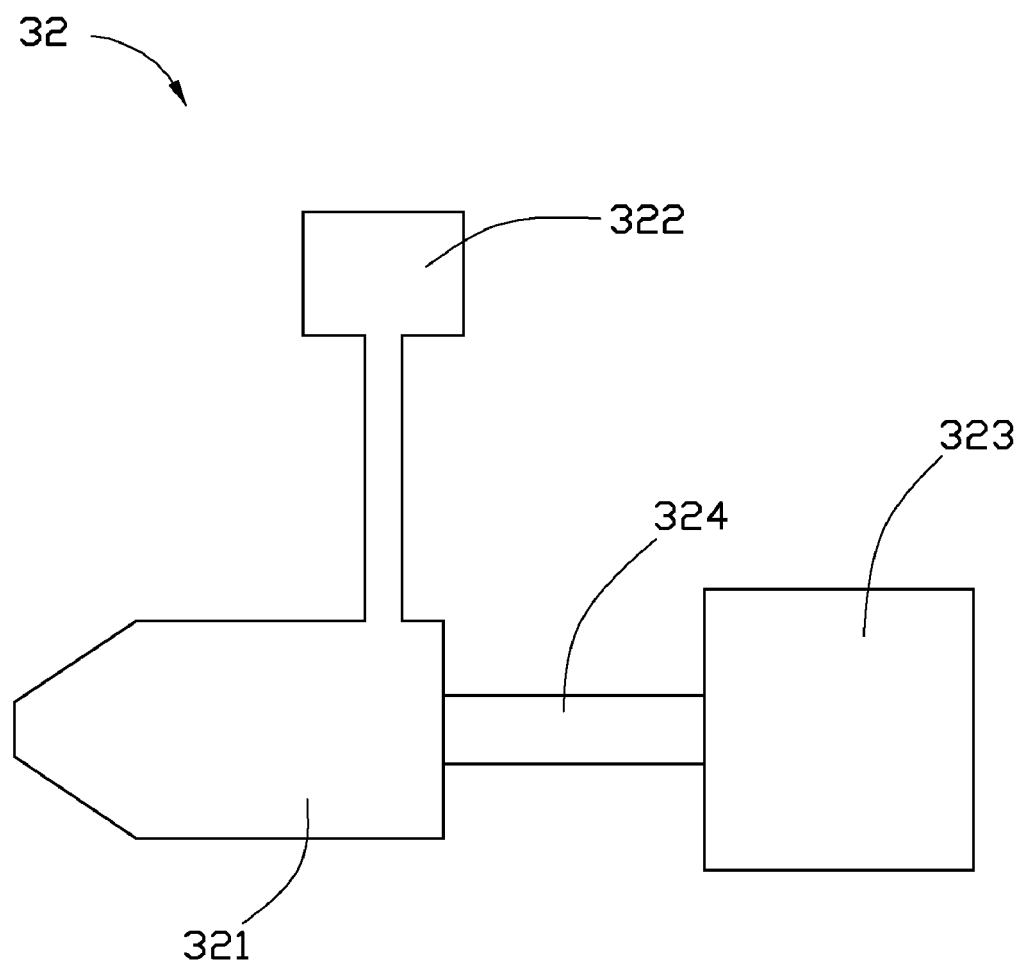
FIG. 2 is an isometric view of a carrying device of the multi-functional assembly device of FIG. 1.

Each of the first side surfaces 312 has a number of carrying devices 32 installed thereon. Referring to FIG. 2, each carrying device 32 includes a gas nozzle 321, a gas valve 322, and a linear motor 323 with a push rod 324 substantially perpendicular to the first side surface 312. The gas nozzle 321 is fixed to the push rod 324 of the linear motor 323, thus, the gas nozzle 321 can be moved towards or away from the lens module 300 held by the supporting boards 20. The gas valve 322 is communicated with the gas nozzle 321 for controlling the gas pressure in the gas nozzle 321, thus, the component 200 can optionally be held by the gas nozzle 321.

Figure 3:
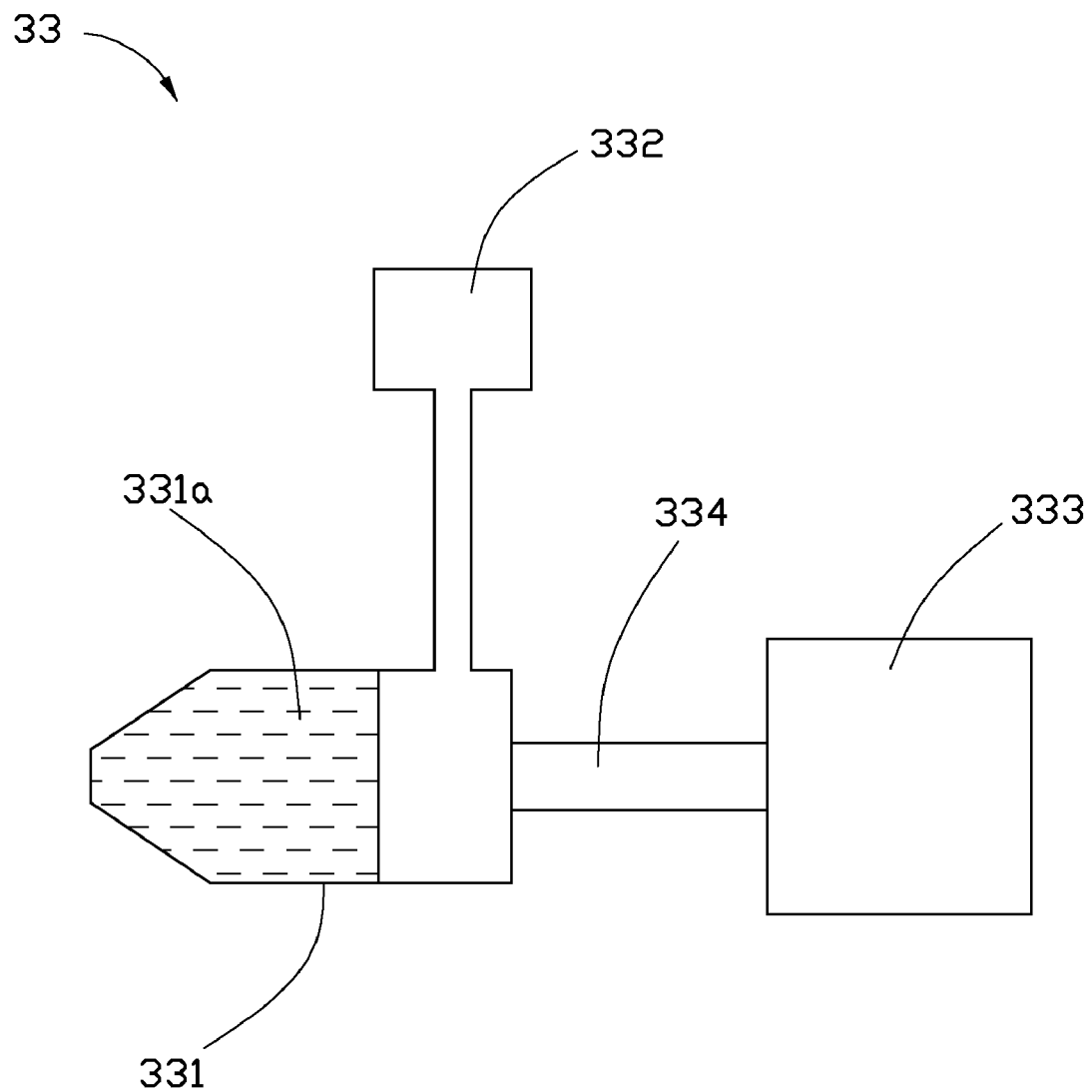
FIG. 3 is an isometric view of a glue dispenser of the multi-functional assembly device of FIG. 1.

Each of the second side surfaces 313 has a number of glue dispensers 33 installed thereon. Referring to FIG. 3, each glue dispenser 33 includes a glue nozzle 331, a glue valve 332, and a linear motor 333 with a push rod 334 substantially perpendicular to the second side surface 313. The glue nozzle 331 is fixed to the push rod 334 of the linear motor 333, thus, the glue nozzle 331 can be moved towards or away from the lens module 300 held by the supporting boards 20. The glue valve 332 communicates with the glue nozzle 331 to regulate dispensation of glue onto the lens module 300.

Each of the third side surfaces 314 has a number of glue solidifying devices 34 installed thereon. The glue solidifying devices 34 are used for solidifying the glue dispensed by the glue dispensers 33. In the present embodiment, the glue dispensed by the glue dispensers 33 is ultraviolet curable glue, and the glue solidifying devices 34 are ultraviolet light emitting devices.

The driving device 40 includes a main body 41 and a rotating shaft 42. The rotating shaft 42 is fixed to the shaft 315 of the rotatable barrel 30, thus, the rotatable barrel 30 can be rotated by the driving device 40.

The controller 50 is electrically connected to and regulates power for the gas valves 322, the linear motors 323, the glue valves 332, the linear motors 333, and the glue solidifying devices. 34.

In operation, the second side surface 313, the first side surface 312, and the third side surface 314 can face the lens modules 300 in sequence by rotating the rotatable barrel 30. Thus, the lens modules 300 can be dispensing glue by the glue dispensers 33 disposed on the second side surface 313 first, then, the components 200 can be place into the lens modules

What is claimed is:

1. A multi-functional assembly device for mounting components into lens modules comprising:
 a fixed barrel comprising a plurality of sidewalls and defining a chamber surrounded by the sidewalls;
 a plurality of supporting boards for holding the lens modules, each supporting board secured on an inner surface of one of the sidewalls;
 a rotatable barrel received in the chamber of the fixed barrel, the rotatable barrel comprising:
  a main body comprising one or more first side surfaces, one or more second side surfaces, and one or more third side surfaces facing the inner surfaces of the sidewalls of the fixed barrel;
  a plurality of carrying devices installed on the one or more first side surfaces for placing components into the lens modules;
  a plurality of glue dispensers installed on the one or more second side surfaces for dispensing glue to the lens modules; and
  a plurality of glue solidifying devices installed on the one or more third side surfaces for solidifying the glue dispensed by the glue dispensers; and
 a driving device for rotating the rotatable barrel.

2. The multi-functional assembly device as claimed in claim 1, further comprising a controller for controlling operation of the carrying devices, the glue dispensers, and the glue solidifying devices.

3. The multi-functional assembly device as claimed in claim 1, wherein the fixed barrel is hexagonal prism-shaped and comprises six sidewalls.

4. The multi-functional assembly device as claimed in claim 3, wherein the main body of the rotatable barrel comprises two opposite first side surfaces, two opposite second side surfaces, and two opposite third side surfaces.

5. The multi-functional assembly device as claimed in claim 1, wherein the second side surface, the first side surface, and the third side surface are connected in sequence.

6. The multi-functional assembly device as claimed in claim 1, wherein the fixed barrel further comprises a bottom wall defining a shaft hole therethrough, and the main body of the rotatable barrel comprises a shaft extending out of the fixed barrel via the shaft hole.

7. The multi-functional assembly device as claimed in claim 1, wherein each supporting board defines a plurality of holding grooves for holding lens modules.

8. The multi-functional assembly device as claimed in claim 1, wherein the supporting boards are detachable from the sidewalls of the fixed barrel.

9. The multi-functional assembly device as claimed in claim 1, wherein the supporting boards are integrally formed with the sidewalls of the fixed barrel.

10. The multi-functional assembly device as claimed in claim 1, wherein each carrying device comprises a gas nozzle, a gas valve, and a linear motor with a push rod substantially perpendicular to the first side surface, the gas nozzle is fixed to the push rod of the linear motor, and the gas valve communicates with the gas nozzle for controlling the gas pressure in the gas nozzle.

11. The multi-functional assembly device as claimed in claim 1, wherein the glue dispenser comprises a glue nozzle, a glue valve, and a linear motor with a push rod substantially perpendicular to the second side surface, the glue nozzle is fixed to the push rod of the linear motor, and the glue valve communicates with the glue nozzle to regulate dispensation of glue onto the lens module.

12. The multi-functional assembly device as claimed in claim 1, wherein the glue is ultraviolet curable glue, and the glue solidifying devices are ultraviolet light emitting devices.

13. A multi-functional assembly device for mounting components into lens modules comprising:
 a fixed barrel comprising a plurality of sidewalls and defining a chamber surrounded by the sidewalls, inner surfaces of the sidewalls being configured for holding lens modules thereon;
 a rotatable barrel received in the chamber of the fixed barrel, the rotatable barrel comprising:
  a main body comprising one or more first side surfaces, one or more second side surfaces, and one or more third side surfaces facing the inner surfaces of the sidewalls of the fixed barrel;
  a plurality of carrying devices installed on the one or more first side surfaces for placing the components into the lens modules;
  a plurality of glue dispensers installed on the one or more second side surfaces for dispensing glue to the lens modules; and
  a plurality of glue solidifying devices installed on the one or more third side surfaces for solidifying the glue dispensed by the glue dispensers,
 a driving device for rotating the rotatable barrel.

14. The multi-functional assembly device as claimed in claim 13, further comprising a controller for controlling operation of the carrying devices, the glue dispensers, and the glue solidifying devices.

15. The multi-functional assembly device as claimed in claim 13, wherein the fixed barrel is hexagonal prism-shaped and comprises six sidewalls.

16. The multi-functional assembly device as claimed in claim 15, wherein the main body of the rotatable barrel comprises two opposite first side surfaces, two opposite second side surfaces, and two opposite third side surfaces.

17. The multi-functional assembly device as claimed in claim 13, wherein the second side surface, the first side surface, and the third side surface are connected in sequence.

18. The multi-functional assembly device as claimed in claim 13, wherein each carrying device comprises a gas nozzle, a gas valve, and a linear motor with a push rod substantially perpendicular to the first side surface, the gas nozzle is fixed to the push rod of the linear motor, and the gas valve is communicated with the gas nozzle for controlling the gas pressure in the gas nozzle.

19. The multi-functional assembly device as claimed in claim 13, wherein the glue dispenser comprises a glue nozzle, a glue valve, and a linear motor with a push rod substantially perpendicular to the second side surface, the glue nozzle is fixed to the push rod of the linear motor, and the glue valve communicates with the glue nozzle to regulate dispensation of glue onto the lens module.

20. The multi-functional assembly device as claimed in claim 13, wherein the glue dispensed by the glue dispensers is ultraviolet curable glue, and the glue solidifying devices are ultraviolet light emitting devices.

* * * * *